United States Patent [19]

Drouet et al.

[11] Patent Number: 4,652,289

[45] Date of Patent: Mar. 24, 1987

[54] PURIFICATION OF EFFLUENT GASES

[75] Inventors: Michel G. Drouet, St-Bruno; Richard J. Munz, Westmount, both of Canada

[73] Assignee: Hydro-Quebec, Montreal, Canada

[21] Appl. No.: 674,675

[22] Filed: Nov. 26, 1984

[51] Int. Cl.$^4$ .............................................. C03B 3/00
[52] U.S. Cl. ........................................ 65/27; 55/99;
   55/474; 55/479; 34/182; 422/159; 422/176;
   422/285; 422/903; 252/629; 252/630; 65/335;
   65/347
[58] Field of Search .................... 55/99, 98, 479, 474;
   110/237, 238, 216; 422/176, 159, 177, 285, 903,
   232, 219; 165/111, 110, 104.15, 104.18; 34/182,
   168; 65/27, 335, 347; 252/629, 630

[56] References Cited

U.S. PATENT DOCUMENTS

| | | | |
|---|---|---|---|
| 1,085,712 | 2/1914 | Vadner | 55/474 |
| 2,321,015 | 6/1943 | Davis | 55/79 |
| 2,897,918 | 8/1959 | Schlotthauer et al. | 55/71 |
| 3,023,836 | 3/1962 | Kasbohm et al. | 55/99 |
| 4,153,411 | 5/1979 | Isheim | 110/238 |
| 4,358,304 | 11/1982 | Froberg | 65/27 |

FOREIGN PATENT DOCUMENTS 12729 1/1984 Japan .................................. 55/474

Primary Examiner—Bernard Nozick
Attorney, Agent, or Firm—Oblon, Fisher, Spivak, McClelland & Maier

[57] ABSTRACT

The disclosure describes a method and a system for treating gaseous effluents to remove impurities therefrom, these gaseous effluents flowing out from a high temperature reactor, into which a particulate material is being fed. The method comprises directing the flow of gaseous effluents counter-currently through the particulate material which is fed into the reactor, and independently controlling the particulate material feed rate and the velocity of the gaseous effluents so that particles in the gas feed are substantially all trapped by the particulate feed material and are returned to the high temperature reactor. Volatile materials may also be condensed on the particulate feed material. The purified gaseous effluents are then allowed to exit. A system for carrying out this method is also disclosed.

2 Claims, 1 Drawing Figure

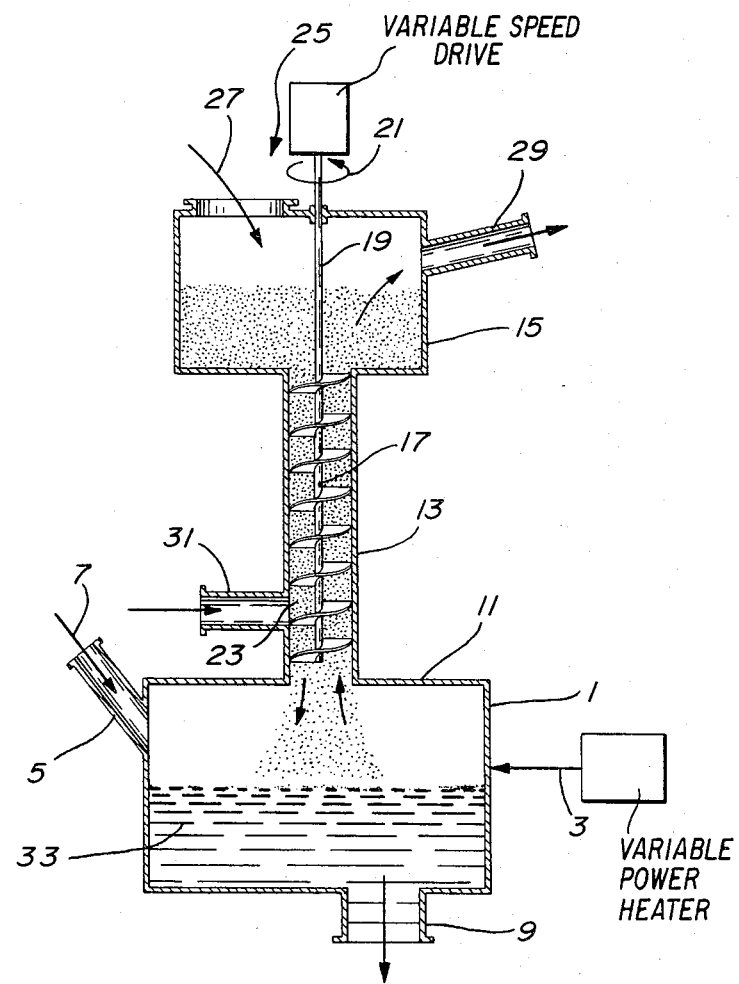

PURIFICATION OF EFFLUENT GASES

BACKGROUND OF INVENTION (a) Field of Invention

This invention relates to the purification of effluent gases. More particularly, the invention relates to the treatment of gaseous effluents produced in or exiting from a high temperature reactor, in order to remove impurities therefrom. Still more specifically, the invention relates to a system and a method for feeding a reactor while filtering off particles away from gases, condensing volatile products, and returning same to the reactor.

(b) Description of Prior Art

It is known that for various reasons, certain materials are heated and/or treated in a reactor or in an oven. In many cases, for example, in those ovens or furnaces which are used for treating materials such as minerals, garbage, radioactive waste, chlorinated polymers, etc., gases are produced or used. These gases contain dust and condensable products. It is necessary to recover the dust and condensable products either because of their commercial value or in order to limit the extent of pollution if they are allowed to escape in the air. Means which are external to the oven, such as filters, separators, condensers, etc. are presently used for treating gases in order to separate dust and condensable products.

It is also known that volatile material, such as oxides of cesium and ruthenium constitute a danger if they are allowed to escape together with gases after having treated nuclear waste before burying the radioactive material.

It is an object of the present invention to successfully condense volatile materials and stop dust which results from the treatment of nuclear waste.

It is another object of the present invention to provide a method which enables to stop dust, droplets, dangerous products, and any undesirable material which can escape into the atmosphere.

SUMMARY OF INVENTION

The present invention relates to a method of treating gaseous effluents to remove impurities therefrom, these gaseous effluents flowing out from a high temperature reactor, and a particulate material being fed into the reactor. The method comprises directing the flow of gaseous effluents counter-currently through some of the particulate material which is being fed into the reactor, and independently controlling the particulate material feed rate and the velocity of the gaseous effluents so that particles in the gas feed are substantially all trapped by the particulate feed material and are returned to the high temperature reactor, and allowing purified gaseous effluents to exit.

In accordance with a preferred embodiment of the invention, the particulate material is fed into the reactor through a downwardly directed duct, and the gaseous effluents are caused to flow upwardly through the downwardly directed duct counter-currently with respect to the particulate material.

In accordance with another preferred embodiment of the invention, the feed rate of the particulate material is controlled so that the particulate material is adapted to match the feed requirement of the reactor.

In accordance with another preferred embodiment of the invention, the velocity of the gaseous effluents is adjusted to provide maximum filtering efficiency as the gaseous effluents move counter-currently through the particulate material.

Preferably, a screw conveyor or similar solids conveyor is provided in the duct, and the speed of the screw conveyor is adjusted so as to feed to the reactor an amount of particulate material which is sufficient to meet the demand of the reactor.

The velocity of the gaseous effluents through the particles in the duct is preferably adjusted by the pitch and diameter of the screw conveyor in order that substantially all impurities present in the gaseous effluents are trapped by the particulate material as the gaseous effluents travel through the duct.

The system for treating gaseous effluents according to the invention comprises a high temperature reactor in which the gaseous effluents are produced, first means for feeding treated material into the reactor, means for heating the content of the reactor, second means separate from the first means for feeding particulate material into the reactor, the particulate material interacting with the treatment material, means for directing a flow of gaseous effluents produced in the reactor, counter-currently to the particulate material, means for independently controlling the particulate material feed rate and the velocity of the gaseous effluents so that particles in the gas feed are substantially all trapped by the particulate feed material and are thereafter returned to the reactor, and means for allowing purified gaseous effluents to exit into the atmosphere.

BRIEF DESCRIPTION OF DRAWINGS

The invention will now be illustrated by means of the following drawings in which:

FIG. 1 is a schematic view of a system for purifying gaseous effluents according to the invention.

DESCRIPTION OF PREFERRED EMBODIMENTS

The system which is illustrated in the drawing includes a reactor 1 which can be used, for instance, to provide a fused product between nuclear waste and sand. The reactor can be heated by any means known to those skilled in the art, such as by using electrodes (not shown). This means has been illustrated schematically by arrow 3. The material which is intended to be treated in the reactor 1, such as sludge, a chlorinated polymer, radioactive material, etc., is introduced into the reactor by means of the inlet 5. The material is introduced into the reactor 1 in the direction indicated by the arrow 7.

At the bottom of the reactor, there is a product outlet 9 which will be used to remove the produce treated in the manner which will be discussed below and the top of the reactor is shut away from the environment by means of the closure 11. A duct 13 is mounted on the closure 11 and, as shown in the drawings, the latter communicates with a chamber 15 which will be discussed more in detail hereinbelow.

Throughout the length of the duct 13, there is a screw conveyor 17 which is connected through a shaft 19 to a means (not shown) to enable the screw to rotate in the direction indicated by the arrow 21. Of course any means conveying the feed particles through the duct could be used without departing from the spirit of the present invention. The particulate material 23 which is intended to be interacted with the nuclear waste is introduced into the chamber 15 at the inlet 25 to flow into the chamber 15 in the direction indicated by the arrow 27. The gases which escape from the system exit at the outlet 29.

In some cases, especially when it is intended to treat dangerous materials, it is preferred to introduce them indirectly into the reactor by means of the secondary inlet 31. In a normal operation of the system, the material to be treated has been inserted into the reactor 1 through the inlet 5. In the case of radioactive material, it is intended to form a glassy mass of the radioactive material to prevent it from being leached away. For this purpose, after having heated the reactor, sand is introduced through the inlet 25 and is allowed to go down the duct 13 in a controlled downward movement as a result of the rotation of the screw conveyor 17. The speed of the conveyor is adjusted so that the feed rate of the particulate material into the reactor is adapted to match the feed requirement of the reactor. By heating the mixture of sand and radioactive material, gaseous products evolve from the bath 33 and a pressure builds up in the reactor which forces the gas to move up counter-currently with respect to the sand through the duct 13 while at the same time riding along the vanes of the screw conveyor 17.

Any reactable products, condensable substances and granular materials or dust will be picked up by the descending sand to be returned the bath 33. The gases which escape into the chamber 15 are allowed to exit into the atmosphere in a relatively pure state.

This system has obvious application for the solidification of nuclear waste, it can also be used in metallurgical ovens, in furnaces which are used to recover special alloys, for incinerating dangerous waste, and in ovens which are used for the production of glass and ceramics. Of course, other uses can be contemplated.

For example, in the case of nuclear waste, this system could be used with sand to condense volatile materials and to stop dust. In the case of toxic waste, where the waste products are incinerated, sand and coke can be used to stop dust and droplets. Sand and a reactive product can be used to stop dangerous products. Finally, dust can be prevented from escaping into the atmosphere in metallurgical furnaces using the system according to the invention.

More specifically, the loss of volatile materials such as oxides of cesium and ruthenium when nuclear wastes are being treated, is controlled by the rate of evaporation from the surface of the liquid bath and the rate of dissolution in the bath. The fact of returning to the bath the wastes which have been volatilized or carried by the gases greatly reduces losses because only a small fraction of the material which is returned to the bath will be revolatilized or carried again by the gases.

In this application, the wastes can be fed in the form of a liquid, solid or mud at inlets 5 or 31.

For the incineration of toxic waste, it is possible to use a continuous feed of coke or sand to catch the droplets and the solid particles which would not be destroyed in the oven. By controlling the temperature of the particulate material before the latter reaches the reactor, the wastes can be burned or returned to the reactor for further treatment.

In certain applications, it could be advantageous to select a particulate material which can react with gaseous chemical products to produce a reaction product which is returned to the reactor.

In metallurgy, the main application is to prevent most of the dust from reaching the atmosphere.

We claim:

1. In a method of treating gaseous effluents to remove substantially all condensable and particulate impurities therefrom, said gaseous effluents flowing out from a high temperature reaction, and a particulate material being fed into said reactor, comprising directing the flow of gaseous effluents counter-currently through the particulate material being fed into said reactor, the improvement which comprises feeding said particulate material through a duct in which there is provided a screw conveyor, adjusting the speed of said screw conveyor so as to feed to said reactor an amount of particulate material which is sufficient to meet the demand of the reactor, passing all said gaseous effluents through the particulate material in said screw conveyor, providing said screw conveyor with a specific pitch and diameter so as to adjust the velocity of the gaseous effluents through the particulate material in order that substantially all condensable and particulate impurities present in said gaseous effluents be trapped by said particulate material as said gaseous effluents travel through said duct.

2. A system for treating gaseous effluents to remove condensable and particulate impurities therefrom, which comprises a high temperature reactor in which said gaseous effluents are produced, first means for feeding treatment material into said reactor, means for heating the content of said reactor, a duct connected to said reactor to feed particulate material into said reactor, said particulate material to interact with said treatment material, a screw conveyor mounted in said duct, and control means to adjust the speed of said screw conveyor so as to feed to said reactor an amount of particulate material which is sufficient to meet the demand of the reactor, means for passing all said gaseous effluents through the particulate material in said screw conveyor, the screw conveyor being provided with a specific pitch and diameter so as to adjust the velocity of the gaseous effluents through the particulate material in order that substantially all condensable and particulate impurities present in said gaseous effluents be trapped by said particulate material as said gaseous effluents travel through said duct.

* * * * *